(12) United States Patent
Van Heuzen et al.

(10) Patent No.: US 8,912,374 B2
(45) Date of Patent: Dec. 16, 2014

(54) PROCESS FOR PRODUCING PARAFFINIC HYDROCARBONS

(75) Inventors: Auke Antoinette Van Heuzen, Amsterdam (NL); Hans De Lang, Amsterdam (NL); Patrick Moureaux, Petit-Couronne (FR); Donald Reinalda, Amsterdam (NL); Marcello Stefano Rigutto, Amsterdam (NL)

(73) Assignee: Shell Oil Company, Houston, TX (US)

( * ) Notice: Subject to any disclaimer, the term of this patent is extended or adjusted under 35 U.S.C. 154(b) by 875 days.

(21) Appl. No.: 12/527,475

(22) PCT Filed: Feb. 20, 2008

(86) PCT No.: PCT/EP2008/052039
§ 371 (c)(1),
(2), (4) Date: Nov. 24, 2009

(87) PCT Pub. No.: WO2008/101945
PCT Pub. Date: Aug. 28, 2008

(65) Prior Publication Data
US 2010/0076236 A1 Mar. 25, 2010

(30) Foreign Application Priority Data
Feb. 20, 2007 (EP) .................................. 07102725

(51) Int. Cl.
*C07C 1/00* (2006.01)
*C10G 3/00* (2006.01)
*C10L 1/08* (2006.01)
*C11C 3/12* (2006.01)

(52) U.S. Cl.
CPC ... *C10L 1/08* (2013.01); *C10G 3/50* (2013.01); *C10G 3/49* (2013.01); *C11C 3/123* (2013.01); *C10G 3/46* (2013.01); *C10G 2400/04* (2013.01); *C10G 2300/1014* (2013.01); *Y02E 50/13* (2013.01); *C10G 2300/1018* (2013.01)
USPC .............. 585/240; 585/242; 44/605

(58) Field of Classification Search
CPC ............ C10G 3/49; C10G 3/54; C10G 45/04; C10G 45/08; C10G 45/12; C10G 47/06; C10G 2300/1011; C10G 2300/1014; C10G 2300/1018; C10G 2300/1081; C10G 2400/04
USPC ..................... 585/240, 242; 44/605
See application file for complete search history.

(56) References Cited

U.S. PATENT DOCUMENTS

| | | | |
|---|---|---|---|
| 4,313,852 A * | 2/1982 | Gavin et al. .................... | 502/180 |
| 4,992,605 A | 2/1991 | Craig et al. .................... | 585/240 |
| 5,705,722 A * | 1/1998 | Monnier et al. ............... | 585/240 |
| 5,959,167 A * | 9/1999 | Shabtai et al. ................. | 585/242 |
| 6,515,033 B2 | 2/2003 | Moore, Jr. et al. | |
| 6,702,937 B2 | 3/2004 | Johnson et al. | |
| 7,232,935 B2 * | 6/2007 | Jakkula et al. ................ | 585/240 |
| 7,550,634 B2 * | 6/2009 | Yao et al. ....................... | 585/240 |
| 7,754,931 B2 * | 7/2010 | Monnier et al. ............... | 585/240 |
| 7,846,323 B2 * | 12/2010 | Abhari et al. .................... | 208/57 |
| 7,999,143 B2 * | 8/2011 | Marker et al. ................. | 585/240 |
| 8,003,836 B2 * | 8/2011 | Marker et al. ................. | 585/240 |
| 8,022,258 B2 * | 9/2011 | Myllyoja et al. ............... | 585/240 |
| 8,026,401 B2 * | 9/2011 | Abhari et al. .................. | 585/240 |
| 8,119,847 B2 * | 2/2012 | Dindi et al. .................... | 585/240 |
| 2004/0230085 A1 | 11/2004 | Jakkula et al. | |
| 2006/0161032 A1 * | 7/2006 | Murzin et al. ................. | 585/240 |
| 2006/0186020 A1 * | 8/2006 | Gomes ........................... | 208/46 |
| 2006/0207166 A1 | 9/2006 | Herskowitz et al. | |

FOREIGN PATENT DOCUMENTS

| | | | |
|---|---|---|---|
| CA | 2149685 | 9/1999 | |
| CN | 1314330 | 11/2000 | ............ B01J 23/881 |
| EP | 0908231 | 4/1999 | |
| EP | 1396531 | 10/2004 | ............... C10G 3/00 |
| EP | 1741768 | 1/2007 | |
| WO | 9728106 | 8/1997 | |
| WO | 2006100584 | 9/2006 | |
| WO | WO 2006/100584 | * 9/2006 | |

OTHER PUBLICATIONS

International Search Report dated May 9, 2008 (PCT/EP2008/052039).
Chen Xiangqian et al., "Production and Application of Alkyl Benzene", China Petrochemical Press, Dec, 31, 1994, pp. 23-24.
Office Action for Chinese Application No. 200880005660.1, dated Jul. 18, 2012.
Iki, Hideshi et al., "Applicability of Hydrogenated Palm Oil for Automotive Fuels", Central Technology Laboratory, Nippon Oil Corp., 16th Saudi Arabia-Japan Joint Symposium, Dhahran, Saudi Arabia, Nov. 2006.
Jones, D.S.J., et al., "Handbook of Petroleum Processing", Chapter 7—'Distillate Hydrocracking', pp. 287-320, Springer Netherlands, 2006.
He, B.B., et al., "Sulfur Content in Selected Oils & Fats and Their Corresponding Methyl Esters", Applied Engineering in Agriculture, 2009, vol. 25(2), pp. 223-226.

(Continued)

*Primary Examiner* — Nina Bhat

(57) ABSTRACT

Process for producing paraffinic hydrocarbons, the process comprising the following steps: (a) contacting hydrogen and a feedstock comprising triglycerides, diglycerides, monoglycerides and/or fatty acids with a hydrogenation catalyst under hydrodeoxygenation conditions; and (b) contacting the whole effluent of step (a) with a hydroprocessing catalyst comprising sulphided Ni and sulphided W or Mo as hydrogenation components on a carrier comprising amorphous silica-alumina and/or a zeolitic compound under hydro-isomerization conditions.

20 Claims, No Drawings

(56) References Cited

OTHER PUBLICATIONS

Casanare, D., et al., "Diesel Fuels From Biomass", Pure Appl. Chem., vol. 79., pp. 2071-2081, 2007.
English Translation: Excerpt—IV Prevulcanization of Hydrogen Catalysts, IIC091669-D-1.
Gosselink, J.W., et al., "Mild Hydrocracking: Coping With Catalyst Deactivation", Catalyst Deactivation 1987, pp. 279-287, Elsevier Science Publishers B.V., Amsterdam.
Laurent, E., et al., Study of the Hydrodeoxygenation of Carbonyl, Carboxylic & Guaiacyl Over Sulfided . . . Catalyst. II. Influence of Water, Ammonia & Hydrogen Sulfide, Applied Catalyst A, 1994, vol. 109, pp. 97-115.
Excerpt from Hawley's Condensed Chemical Dictionary, 13th Ed., 1997.
Satterfield, C.N., "Trickle Bed Reactors", AIChE Journal, Mar. 1975, vol. 21, No. 2, pp. 209-228.
Gevert, B., "Hydroprocessing of Oil From Biomass Liquefaction", Chalmers University of Technology, Sweden, Springer Science, Business Media Dordrecht 1993, pp. 1424-1431.
European Standard—EN 590—"Automotive Fuels—Diesel—Requirements & Test Methods", ICS 75.160.20, Jan. 2004.
Grunecker Opposition Statement (Annex 1—Pursuant to EPC Rule 76(2)(c)) regarding EP 2121876 (08 709 121.1) dated Nov. 20, 2013, Ref. No. EPE19894JH242me.
Grunecker Opposition Statement against EP 2121876 (08 709 121.1) dated Nov. 20, 2013, Ref. No. EPE19894JH242mef.
van Gerpen, et al., "Sulfur Content in Selected Oils and Fas and Their Corresponding Methyl Esters", Applied Engineering in Agriculture, vol. 25(2) pp. 223-226.

* cited by examiner

PROCESS FOR PRODUCING PARAFFINIC HYDROCARBONS

The present application is a national phase application of International Application No. PCT/EP2008/052039, filed on Feb. 20, 2008, which claims priority from European Patent Application 07102725.4 filed 20 Feb. 2007.

FIELD OF THE INVENTION

The invention provides a process for producing paraffinic hydrocarbons from a feedstock comprising triglycerides, diglycerides, monoglycerides and/or fatty acids, in particular from vegetable oil, animal fat or fish oil.

BACKGROUND OF THE INVENTION

It is known that paraffinic hydrocarbons boiling in the diesel range may be produced from triglyceride-comprising feedstocks from biological origin such as vegetable oil, animal fat or fish oil.

In U.S. Pat. No. 4,992,605 for example is disclosed a process for producing hydrocarbon products in the diesel boiling range, mainly $C_{15}$-$C_{18}$ straight chain paraffins. The process comprises hydroprocessing vegetable oils or some fatty acids at conditions effective to cause hydrogenation, hydrotreating and hydrocracking of the feedstock (temperature 350-450° C.; pressure 4.8-15.2 MPa; liquid hourly space velocity 0.5-5.0 $hr^{-1}$) using a commercially available hydroprocessing catalyst. Cobalt-molybdenum and nickel-molybdenum hydroprocessing catalysts are mentioned as suitable catalysts. Co—Mo and Ni—Mo catalysts are exemplified in the examples. In the process of U.S. Pat. No. 4,992,605, straight chain paraffins are produced that have undesirable cold flow properties, i.e. a relatively high pour point and cloud point.

In U.S. Pat. No. 5,705,722 is disclosed a process for producing liquid hydrocarbons boiling in the diesel fuel range from a biomass feedstock comprising tall oil with a relatively high content of unsaturated compounds. The feedstock is hydroprocessed at a temperature of at least 350° C. Cobalt-molybdenum and nickel-molybdenum hydroprocessing catalysts are mentioned as suitable catalysts. Co—Mo and Ni—Mo catalysts are exemplified in the examples. Also in the process of U.S. Pat. No. 5,705,722, mainly normal alkanes are produced that have undesirable cold flow properties, i.e. a relatively high pour point and cloud point.

In EP 1 396 531 is disclosed a process for converting a feedstock selected from vegetable oil, animal fats or fish oil into liquid hydrocarbons, the process comprising a hydro-deoxygenation step followed by a hydro-isomerisation step. In this way, branched hydrocarbons with desirable cold flow properties are produced. The hydro-isomerisation step is operated using the counter-current flow principle. It is mentioned that for the hydro-deoxygenation step typically NiMo or CoMo catalyst are used. For the hydro-isomerisation step, the catalyst may comprise Pt, Pd or reduced Ni. Noble metal hydro-isomerisation catalysts (Pt or Pd) are preferred and exemplified. The feedstock is preferably pre-hydrogenated under mild conditions prior to the hydro-deoxygenation step.

In the process of EP 1 396 531, an expensive noble metal catalyst is used in the hydro-isomerisation step. Since noble metal catalyst are very sensitive to catalyst poisons, it is necessary to remove impurities from the effluent of the hydro-deoxygenation step. This is done by counter-current operation of the hydro-isomerisation step and/or a stripping step between the hydro-deoxygenation and the hydro-isomerisation step.

SUMMARY OF THE INVENTION

It has now been found that by using, in a hydro-deoxygenation/hydro-isomerisation process, a hydroprocessing catalyst comprising sulphided Ni and sulphided W or Mo as hydrogenating components on an acidic catalyst carrier for the hydro-isomerisation step, a feedstock containing triglycerides, diglycerides, monoglycerides and/or fatty acids can be converted into paraffinic diesel components with excellent cold flow properties in a single stage, i.e. by supplying the whole effluent of the hydro-deoxygenation step to the hydro-isomerisation step, without the need to operate the hydro-isomerisation step counter-currently.

Accordingly, the present invention provides a process for producing paraffinic hydrocarbons, the process comprising the following steps:

(a) contacting hydrogen and a feedstock comprising triglycerides, diglycerides, monoglycerides and/or fatty acids with a hydrogenation catalyst under hydro-deoxygenation conditions; and (b) contacting the whole effluent of step (a) with a hydroprocessing catalyst comprising sulphided Ni and sulphided W or Mo as hydrogenation components on a carrier comprising amorphous silica-alumina and/or a zeolitic compound under hydro-isomerisation conditions.

An important advantage of the process according to the invention is that no expensive noble metal catalyst is needed for the hydro-isomerisation step.

Another advantage is that the process according to the invention may be carried out in a single reactor vessel, either in a stacked catalyst bed configuration or, in case the hydrogenation catalyst of step (a) and the hydroprocessing catalyst of step (b) have the same composition, in a single catalyst bed. By adiabatically operating the single reactor, the exothermic heat that is released in the hydro-deoxygenation reaction can be used to provide for the higher temperature needed for the hydro-isomerisation reaction.

Since a catalyst comprising sulphided Ni and sulphided W or Mo is less sensitive to poisoning than the noble metal catalysts used in the hydro-isomerisation step of the prior art hydro-deoxygenation/hydro-isomerisation process, there is no need to almost completely remove impurities from the hydro-deoxygenation effluent and/or to operate the hydro-isomerisation step counter-currently.

DETAILED DESCRIPTION OF THE INVENTION

In the process according to the invention, hydrogen and a feedstock comprising triglycerides, diglycerides, monoglycerides and/or fatty acids are first contacted with a hydrogenation catalyst under hydro-deoxygenation conditions (step (a)). The whole effluent of step (a), i.e. unconverted feedstock, reactants such as hydrocarbons, water and carbon oxides and unconverted hydrogen, is then contacted with a hydroprocessing catalyst comprising sulphided Ni and sulphided W or Mo as hydrogenation components on a carrier comprising amorphous silica-alumina and/or a zeolitic compound under hydro-isomerisation conditions (step (b)).

The two steps of the process according to the invention may be carried out in a single reactor vessel or in two separate reactor vessels. Preferably, the process is carried out in a single reactor vessel. More preferably the process is carried out in a stacked catalyst bed configuration, i.e. a catalyst bed comprising the hydrogenation catalyst of step (a) on top of a catalyst bed comprising the hydroprocessing catalyst of step (b). Each step may be carried out in two or more catalyst beds in series.

In case the hydrogenation catalyst of step (a) has the same composition as the hydroprocessing catalyst of step (b), the process may be carried out in a single catalyst bed.

Preferably, the feedstock comprises triglycerides, more preferably at least 40 wt % triglycerides, even more preferably at least 60 wt %. Suitably, the feedstock comprises vegetable oil, animal fat or fish oil to provide for the triglycerides. Preferably, the feedstock is vegetable oil, animal fat or fish oil. Mixtures of the vegetable oils, animal fats, fish oils, and mixtures which include vegetable oil, animal fat and/or fish oil may be used. Preferably, the vegetable oil, animal fat or fish oil is in anhydrous or refined form. The oil or fat may contain free fatty acids and/or mono-esters of fatty acids (monoglycerides) and other compounds that naturally occur in the oil or fat, for example carotenoids, phosphatides, terpenes, sterols, fatty alcohols, tocopherols, polyisoprene, carbohydrates and proteins.

Suitable vegetable oils include rapeseed oil, palm oil, coconut oil, corn oil, soy oil, safflower oil, sunflower oil, linseed oil, olive oil and peanut oil. Suitable animal fats include pork lard, beef fat, mutton fat and chicken fat.

Particularly preferred feedstocks are rapeseed oil and palm oil, in particular palm oil. It has been found that particularly the use of palm oil results in good cold flow properties of the paraffinic hydrocarbons obtained.

In step (a), the feedstock is hydro-deoxygenated. Triglycerides, diglycerides, monoglycerides and free fatty acids are typically converted into hydrocarbons, water and carbon oxides. The extent to which decarboxylation occurs depends on the hydrogenation catalyst used and the process conditions applied.

The feedstock may be subjected to a pre-hydrogenation step prior to hydrogenation step (a) for saturation of double bonds in the fatty acid chains of the glycerides and free fatty acids. Pre-hydrogenation will reduce side reactions of the double bonds such as polymerisation, ring formation and aromatisation. In such pre-hydrogenation step, the feedstock is contacted in the presence of hydrogen with a hydrogenation catalyst, typically under milder conditions than the hydro-deoxygenation conditions of step (a). The pre-hydrogenation catalyst may be any hydrogenation catalyst known in the art, preferably a catalyst comprising sulphided Ni or Co and sulphided W or Mo.

In step (a), the feedstock, optionally pre-hydrogenated, and hydrogen are contacted with the hydrogenation catalyst under hydro-deoxygenation conditions. Preferably, feedstock and hydrogen are co-currently contacted with the catalyst.

Hydro-deoxygenation conditions for glyceride- and fatty acid-containing feedstocks are known in the art. Typically, the hydro-deoxygenation temperature in step (a) is in the range of from 250 to 380° C., preferably of from 280 to 340° C., more preferably of from 290 to 320° C. Reference herein to the hydro-deoxygenation temperature is to the maximum temperature that is occurring in hydro-deoxygenation step (a). Since the hydro-deoxygenation reaction is a strongly exothermic reaction, the temperature in the bottom part of the bed will typically be higher than the temperature in the upper part of the bed.

In order to control the temperature increase over the catalyst bed of step (a), staged supply of feedstock and/or of hydrogen may be applied. An alternative way to control the temperature increase over the catalyst bed is to dilute the feedstock supplied to step (a), preferably by recycling hydro-isomerised product obtained in step (b) to step (a).

The ratio of hydrogen-to-feed supplied to the catalyst of step (a) is typically in the range of from 200 to 10,000 normal liters (NL), i.e. liters at standard conditions of T and P (0° C. and 1 atm.) per kilogram feed, preferably of from 500 to 8,000 NL/kg, more preferably of from 1,000 to 5,000 NL/kg. Reference herein to feed is to the total of feedstock and diluent, i.e. to the total of feedstock and product recycle if the feedstock is diluted with a product recycle stream.

The feed is typically supplied to the catalyst of step (a) at a weight hourly space velocity (WHSV) in the range of from 0.1 to 10 kg feed per liter catalyst per hour, preferably of from 0.2 to 5.0 kg/L·hr, more preferable of from 0.5 to 3.0 kg/L·hr. The WHSV in hydro-isomerisation step (b) is preferably in the range of from 0.1 to 2.0 kg feed per liter catalyst per hour, more preferably of from 0.5 to 1.0 kg/L·hr. Since the WHSV in step (b) is preferably lower than in step (a), the catalyst bed of step (b) is preferably larger than the catalyst bed of step (a). Reference herein to the WHSV for step (b) is to the weight of feed supplied to step (a) per liter catalyst of step (b) per hour. It will be appreciated that in case steps (a) and (b) are carried out in a single catalyst bed, only an overall WHSV can be defined.

Preferably, the glyceride- and/or free fatty acid-containing feedstock that is supplied to step (a) is pre-heated to a temperature of at most 320° C. Above 320° C., thermal degradation may occur.

In hydro-isomerisation step (b), the whole effluent of step (a) is contacted with the hydroprocessing catalyst of step (b). The effluent typically comprises sufficient hydrogen for the hydro-isomerisation reaction to occur. Additional hydrogen may, however, be added to the catalyst of step (b) for the purpose of quenching (cooling) or for supplying heat to step (b). Alternatively, additional feedstock, preferably pre-saturated feedstock, may be added to step (b) for the purpose of quenching.

Hydro-isomerisation conditions are known in the art. Preferably, the hydro-isomerisation temperature is in the range of from 300 to 450° C., more preferably of from 350 to 420° C., even more preferably of from 370 to 400° C. If hydro-deoxygenation step (a) is operated such that the effluent of step (a) has a sufficiently high temperature to provide for the hydro-isomerisation temperature, then no additional heating is needed. If, however, the effluent of step (a) has a temperature below the desired hydro-isomerisation temperature, then additional heat needs to be added to step (b), for example by adding heated hydrogen to step (b).

If additional hydrogen is supplied to step (b), then this is preferably done co-currently with the effluent of step (a). As has been described hereinabove, there is no need to operate step (b) counter-currently, since there is no need for a substantially complete removal of contaminants from the effluent of step (a).

The total pressure in steps (a) and (b) is preferably in the range of from 20 to 160 bar (absolute), more preferably of from 40 to 120 bar (absolute), even more preferable of from 50 to 80 bar (absolute).

The hydrogenation catalyst of step (a) may be any hydrogenation catalyst known in the art that is suitable for hydro-deoxygenation, typically a catalyst comprising metals of Group VIII and/or Group VIB of the Periodic Table of Elements or compounds thereof. Examples of such catalysts are catalysts comprising Pd, Pt, reduced Ni, or sulphided CoMo, NiMo or NiW as hydrogenation components on a carrier. The carrier typically comprises a refractory oxide, preferably alumina, amorphous silica-alumina, titania or silica. The carrier may comprise a zeolitic compound. If a catalyst comprising sulphided CoMo, NiMo or NiW is used, the catalyst may be sulphided in-situ or ex-situ. In the case of in-situ sulphiding, a sulphur source, usually hydrogen sulphide or a hydrogen sulphide precursor, is typically supplied to the catalyst during operation of the process.

The hydroprocessing catalyst of step (b) comprises sulphided Ni and sulphided W or Mo as hydrogenation components on a carrier comprising amorphous silica-alumina and/or a zeolitic compound. Such catalysts and their preparation are well-known in the art. Preferably, the catalyst of step (b) comprises sulphided Ni and sulphided W. The catalyst may comprise sulphided Ni, W and Mo (sulphided NiMoW catalyst).

The hydroprocessing catalyst of step (b) may be sulphided in-situ or ex-situ. In-situ sulphiding may be achieved by supplying a sulphur source, usually hydrogen sulphide or a hydrogen sulphide precursor, i.e. a compound that easily decomposes into hydrogen sulphide such as for example dimethyl disulphide, di-tert-nonyl polysulphide or di-tert-butyl polysulphide, to the catalyst bed of step (a). The sulphur source may be supplied with the feedstock, the hydrogen or separately. In case only in step (b) a sulphided catalyst is used, the sulphur source is preferably supplied to the catalyst bed of step (b). Preferably at least 1,500 ppmw hydrogen sulphide or an amount of a hydrogen sulphide precursor that is equivalent to at least 1,500 ppmw hydrogen sulphide, based on the weight of hydrogen supplied, is supplied to step (a) or step (b), more preferably at least 5,000 ppmw, even more preferably at least 10,000 ppmw.

The catalyst of step (b) may comprise a zeolitic compound. Any acidic zeolitic compound having hydro-isomerising activity may suitably be used. Such zeolitic compounds are known in the art. Examples of such zeolitic compounds include, but are not limited to, zeolite Y, zeolite beta, ZSM-5, ZSM-12, ZSM-22, ZSM-23, ZSM-48, SAPO-11, SAPO-41, and ferrierite.

An advantage of the process according to the invention is that the same catalyst may be used in both steps (a) and (b), i.e. a sulphided NiMo catalyst or a sulphided NiW catalyst, preferably a sulphided NiW catalyst. If the same catalyst is used, then the process is preferably carried out in a single catalyst bed. The feedstock contacted with the catalyst is then first hydro-deoxygenated and the straight-chain hydrocarbons formed are subsequently hydro-isomerised on the same catalyst. By operating the catalyst bed adiabatically, a temperature gradient can be maintained over the catalyst bed, thus providing in the first part of the bed optimum temperature conditions for the hydro-deoxygenation step and in the second part of the catalyst bed optimum temperature conditions for the hydro-isomerisation step. If the exothermic heat released would raise the temperature too much, then quenching with additional hydrogen or feedstock could be applied to control the temperature.

If step (b) is co-currently operated, the effluent of step (b) is preferably separated into a gaseous effluent comprising hydrogen, carbon oxides, steam and light hydrocarbons, and a liquid effluent. Hydrogen from the gaseous effluent, preferably after removal of the other components, is preferably recycled to step (a) and/or step (b). The liquid effluent comprises paraffinic hydrocarbons boiling in the diesel range and may suitably be used in a diesel fuel. Part of the liquid effluent may be recycled to step (a) and/or step (b) to help control the exothermic temperature increase.

EXAMPLES

The process according to the invention is illustrated by means of the following non-limiting examples.

Example 1

In a reactor, two catalyst beds were placed in a stacked bed configuration: 10 mL of a conventional hydrotreating catalyst comprising 3.5 wt % NiO and 15 wt % $MoO_3$ on a support of alumina, was placed above 10 mL of a catalyst comprising 5 wt % NiO and 21 wt % $W_2O_3$ on amorphous silica-alumina. Both catalysts were 1:1 diluted with 0.1 mm diameter silicon carbide spheres.

The temperature of each bed was independently controlled by means of an oven. The temperature of the top bed was set at 300° C.; the temperature of the bottom bed at 390° C. A feedstock consisting of refined rapeseed oil was supplied to the top bed at a WHSV of 1.0 g oil per mL catalyst of the top bed per hour. A gas stream comprising 2.5 vol % hydrogen sulphide and 97.5 vol % hydrogen was supplied to the top bed at a gas-to-oil ratio of 2,000 NL/kg. The total pressure was 100 bar (absolute) in both beds.

The degree of isomerisation of the liquid effluent of the reactor was determined by gas chromatography. The cloud point and pour point of the liquid effluent were determined according to ASTM D 2500 and ASTM D 97, respectively. The weight percentage of branched paraffins in the effluent was 69%. The effluent had a cloud point of –20° C. and a pour point of –27° C.

Example 2

In the same reactor as used in EXAMPLE 1 was placed:
a first catalyst bed of 4 mL of a catalyst comprising 5 wt % NiO and 21 wt % $W_2O_3$ on amorphous silica-alumina diluted with 16 mL of 0.1 mm diameter silicon carbide spheres; and
a second catalyst bed of 10 mL of the same catalyst as in the first bed diluted with 10 mL of 0.1 mm diameter silicon carbide spheres.

The first bed was placed on top of the second bed.

At 60 bar (absolute) total pressure, refined rapeseed oil was fed to the top of the stacked bed at a feed rate of 10 grams per hour. A gas stream comprising 1.1 vol % hydrogen sulphide and 98.9 vol % hydrogen was continuously supplied to the top of the stacked bed. The gas-to-oil ratio was 2,100 NL/kg. The temperature of the first bed was set at 320° C. and the temperature of the second bed at 370° C.

The weight percentage of branched paraffins in the liquid effluent was 49.3%. The liquid effluent had a cloud point –6° C. and a pour point of –6° C. Degree of isomerisation, cloud point and pour point were determined as described in EXAMPLE 1.

Example 3

A single catalyst bed of 10 mL of a catalyst comprising 5 wt % NiO and 21 wt % $W_2O_3$ on a catalyst carrier comprising 1.25 wt % zeolite beta, 1.0 wt % ultra-stable zeolite Y and the balance (97.3 wt %) amorphous silica-alumina diluted with 10 mL of 0.1 mm diameter silicon carbide spheres was placed in a reactor tube. At 60 bar (absolute) total pressure, refined palm oil was supplied to the top of the catalyst bed at a feed rate of 1.0 gram oil per ml catalyst per hour. A gas stream comprising 2.5 vol % hydrogen sulphide and 97.5 vol % hydrogen was continuously supplied to the top of the stacked bed. The gas-to-oil ratio was 2,000 NL/kg. Adiabatic operation of the catalyst bed was simulated by maintaining a temperature profile over the catalyst bed. At the top of the bed, the temperature was set at 320° C.; at the bottom, the temperature was set at 370° C.

The weight percentage of branched paraffins in the effluent was 43.1%. The effluent had a cloud point of −3° C. and a pour point of −3° C. Degree of isomerisation, cloud point and pour point were determined as described in EXAMPLE 1.

What is claimed is:

1. Process for producing paraffinic hydrocarbons, the process comprising the following steps:
    (a) contacting hydrogen and a feedstock comprising triglycerides, diglycerides, monoglycerides and/or fatty acids with a hydrogenation catalyst under hydro-deoxygenation conditions; and
    (b) contacting the whole effluent of step (a) with a hydroprocessing catalyst comprising sulphided Ni and sulphided W or Mo as hydrogenation components on a carrier comprising amorphous silica-alumina and/or a zeolitic compound under hydro-isomerisation conditions.

2. A process according to claim 1, wherein the feedstock comprises triglycerides.

3. A process according to claim 2, wherein the catalyst of step (b) comprises sulphided Ni and sulphided W as hydrogenation components.

4. A process according to claim 2, wherein the catalysts of step (a) and of step (b) have the same composition.

5. A process according to claim 4, wherein steps (a) and (b) are carried out in a single reactor vessel in the same catalyst bed.

6. A process according to claim 2, wherein the process is carried out in a single reactor vessel in a stacked catalyst bed configuration.

7. A process according to claim 1, wherein the catalyst of step (b) comprises sulphided Ni and sulphided W as hydrogenation components.

8. A process according to claim 7, wherein the catalysts of step (a) and of step (b) have the same composition.

9. A process according to claim 7, wherein the process is carried out in a single reactor vessel in a stacked catalyst bed configuration.

10. A process according to claim 1, wherein the catalysts of step (a) and of step (b) have the same composition.

11. A process according to claim 10, wherein steps (a) and (b) are carried out in a single reactor vessel in the same catalyst bed.

12. A process according to claim 10, wherein the process is carried out in a single reactor vessel in a stacked catalyst bed configuration.

13. A process according to claim 1, wherein the process is carried out in a single reactor vessel in a stacked catalyst bed configuration.

14. A process according to claim 13, wherein the reactor is adiabatically operated.

15. A process according to claim 1, wherein the temperature in step (a) is in the range of from 250 to 380° C.

16. A process according to claim 1, wherein the temperature in step (b) is in the range of from 300 to 450° C.

17. A process according to claim 1, wherein the total pressure in steps (a) and (b) is in the range of from 20 to 160 bar (absolute).

18. A process according to claim 1, wherein the feedstock comprises vegetable oil, animal fat, fish oil, or a combination of one or more thereof.

19. A process according to claim 18, wherein the feedstock comprises one or more vegetable oils.

20. A process according to claim 1, wherein the effluent of step (b) is separated in a gaseous effluent and a liquid effluent comprising paraffinic hydrocarbons boiling in the diesel range.

\* \* \* \* \*